(12) United States Patent
Marmaropoulos

(10) Patent No.: US 6,535,102 B2
(45) Date of Patent: Mar. 18, 2003

(54) CONTROL DEVICE FOR WEARABLE ELECTRONICS

(75) Inventor: George Marmaropoulos, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/759,020

(22) Filed: Jan. 11, 2001

(65) Prior Publication Data
US 2001/0017759 A1 Aug. 30, 2001

(30) Foreign Application Priority Data

Feb. 26, 2000 (GB) .............................................. 0004494

(51) Int. Cl.⁷ .............................................. A01L 10/10
(52) U.S. Cl. ............................ 338/6; 338/210; 338/212
(58) Field of Search ............................ 338/6, 114, 208, 338/209, 210, 212; 73/882.632

(56) References Cited

U.S. PATENT DOCUMENTS

| 4,059,830 A | * | 11/1977 | Threadgill | 340/575 |
| 4,444,205 A | * | 4/1984 | Jackson | 600/595 |
| 4,715,235 A | | 12/1987 | Fukui et al. | 73/862.68 |
| 5,079,535 A | * | 1/1992 | Neuman et al. | 338/2 |
| 5,086,785 A | * | 2/1992 | Gentile et al. | 128/782 |
| 5,444,462 A | * | 8/1995 | Wambach | 345/158 |
| 5,606,303 A | * | 2/1997 | Suski | 338/210 |
| 5,798,907 A | | 8/1998 | Janik | 361/683 |
| 5,912,653 A | | 6/1999 | Fitch | 345/87 |
| 5,945,929 A | * | 8/1999 | Westra | 341/34 |
| 6,264,029 B1 | * | 7/2001 | Motson | 206/320 |
| 6,356,437 B1 | * | 3/2002 | Mitchell et al. | 361/683 |

FOREIGN PATENT DOCUMENTS

| GB | 2328605 | 3/1999 | ........... A63B/71/06 |
| WO | WO8911633 | 11/1989 | ........... G01D/5/16 |
| WO | WO9936757 | 7/1999 | ........... G01L/1/20 |

* cited by examiner

Primary Examiner—Karl D. Easthom
(74) Attorney, Agent, or Firm—Gregory L. Thorne

(57) ABSTRACT

In a garment 10, 12 incorporating an electronic device such as a radio 16, a variable of the device, such as volume, is varied by the use of two cords 22, 24, the electrical resistance of each cord decreasing in accordance with an increase in tension applied to the cord; pulling one cord increases the volume of the radio and pulling the other cord decreases the volume. The stronger the pull, the faster the change in volume. The ends of the cords lie outside the garment and carry toggles 26, 28 for easy operation by a gloved hand. Alternatively the ends of the cord outside the garment may be connected to opposite ends of a manual grip 48.

3 Claims, 2 Drawing Sheets

CONTROL DEVICE FOR WEARABLE ELECTRONICS

The present invention relates to a control device for wearable electronics devices and systems, that is to say, to an electronic device configured such as to be incorporated into conventional clothing, and designed so as to be comfortable for the user to wear. This comfort may arise through the avoidance of flat, rigid surfaces, but preferably comes from the use, so far as possible, of flexible parts conformable to the human body.

Examples of wearable electronics are given in the commonly-assigned UK patent application number 9927842.6 filed 26th November 1999 and entitled "Improved Fabric Antenna", and U.S. Pat. Nos. 5,798,907 and 5,912,653.

For such electronic devices, control by conventional rotary knobs, slider potentiometers, and rocker switches is often inconvenient, and especially difficult when the wearable electronics device is intended for use by those having limited manual dexterity, whether through age or infirmity, or through the device being incorporated into outdoor winter garments, when the wearer is likely to be wearing gloves or mittens.

A particularly useful feature in wearable electronics is the ability to adjust performance in response to detected movements of the user. To this end, it is known to provide a fabric which has an electrical resistance which varies as a fabric is deformed: U.S. Pat. No. 4,715,235 (assigned to Asahi Kasei Kogyo Kabushiki Kaisha) discloses a deformation sensitive electroconductive knitted or woven fabric. In the described fabric construction, the electroconductivity is changed when stretch or compression is applied to the fabric, and the provision of electrodes at two or more positions on the fabric allows the degree of deformation to be sensed electrically. The disclosure of U.S. Pat. No. 4,715,235 relates mainly to the construction of the fabric; applications mentioned include a device for detecting stretch or flex in a joint of a human body or human respiration; as a finger switch mounted to lie along a finger portion of a glove and operable by flexing the finger; as a touch sensor on a window frame or hand rail to detect criminal entry; and as an industrial sensor to control a robot.

It is an object of the present invention to provide a control device for wearable electronics which is simple and intuitive in use, and which can be used by an impaired or gloved hand.

In accordance with the present invention there is provided a manual control for an electronic device which has control means to vary a variable of the device having at least one cord electrically connected to the control means, the cord having an electrical property which varies in accordance with the tension applied to the cord.

Also according to the invention, there is provided a garment for use with an electronic device which has a control means to vary a variable of the device, the garment comprising means to support the electronic device, at least one cord having a first end connected electrically to the control means, the cord having an electrical property which varies in accordance with the tension applied to a second end of the cord, and the control means being arranged to sense the electrical property of the cord and to vary the variable of the electrical device accordingly.

Further features and advantages of the present invention are defined in the attached claims or will become apparent from reading of the following description of embodiments of the present invention.

Preferred embodiments of the invention will now be described by way of example only with reference to the accompanying drawings in which.

Figure 1:
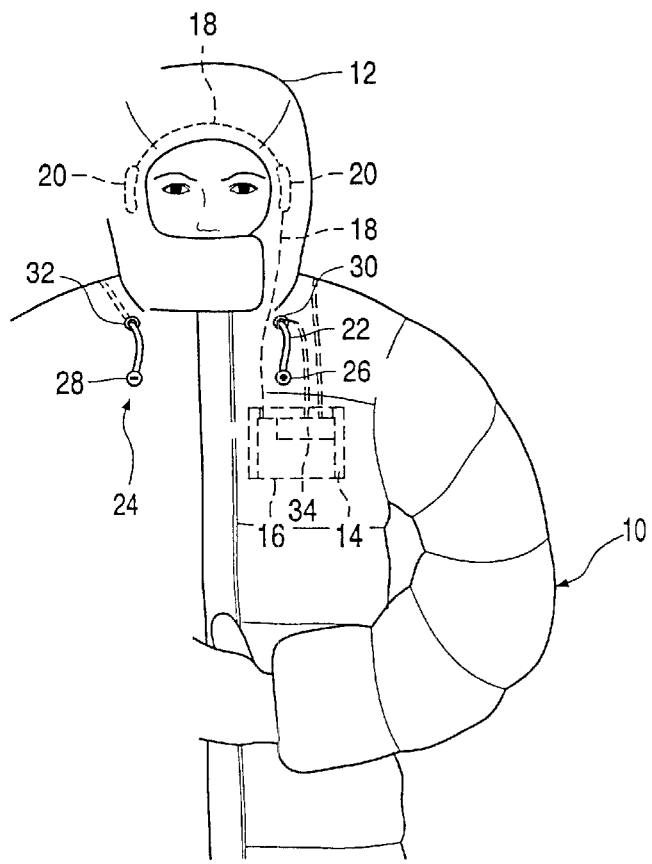
FIG. 1 illustrates a first embodiment of a manual control for wearable electronics.

In FIG. 1, a winter-wear garment 10 with a hood 12 has within an inside pocket 14 an electronic device such as a radio 16 connected by a flexible connection 18 to earphones 20 incorporated within the hood 12.

On the outside of the garment 10 are two lengths of cord (or string or layered and elastically stitched fabric or the like) 22, 24. Each cord has on its outer end a toggle 26, 28. The cords pass through eyelets 30, 32 to the inside of the garment 10 and the cords 22, 24 within the garment (shown dotted) are connected electrically to the radio 16, and mechanically to the garment. For ease of cleaning of the garment, simple electrical connectors (for example metal press studs) are preferably used to enable the radio 16 to be disconnected from the cords and removed from the pocket 14: by providing such press studs on the outer casing of the radio and the inner surface of the pocket 14, they actively assist in mechanically holding the radio in place.

Each cord 22, 24 consists for its entire length, or a substantial part of its length adjacent the radio 16, of a stretchable material having an electrical resistance which varies with the applied tension, i.e. when the cord is stretched, the resistance decreases or increases. Woven constructions of conductive and non-conductive materials, such as those used in the above-referenced U.S. Pat. No. 4,715,235, may form the material for the cord, or other constructions may be used.

In the example of FIG. 1, the cords 22, 24 are arranged to control the volume of the radio 16; as the toggle 26 of the cord 22 is pulled, the resistance of the cord 22 decreases and a sensor circuit 34 forming part of the radio responds to the decrease so as to increase the volume of sound supplied to the earphones 18. The stronger the pull on the toggle 26, the greater the stretch applied to the cord and the faster the volume is increased—i.e. a strong pull gives a rapid increase, a gentle pull gives a slower increase in volume.

The cord 24 is arranged to decrease the volume; the cord passes around the back of the neck of the garment 10 to the radio 16. When the cord 24 is stretched, the sensor circuit 34 senses the reduction in resistance in the cord and reduces the volume of sound supplied to the earphones 18.

It will be clear from FIG. 1 that the cords 22, 24 are easily operated by means of their toggles 26, 28 by a gloved hand.

Figure 2:
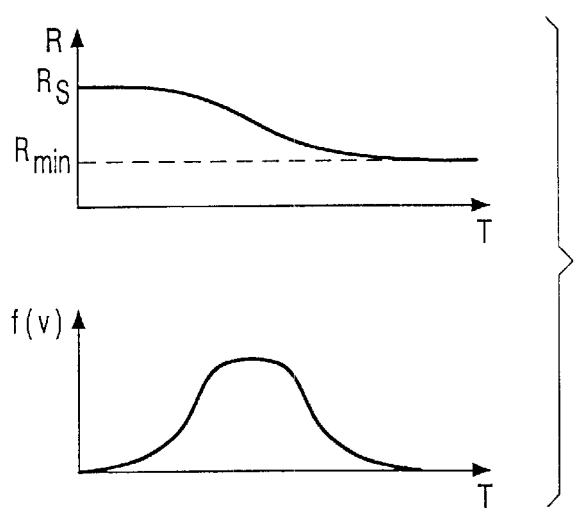
FIG. 2 illustrates variation of resistance and of rate of change of volume with tension applied to a cord.

FIG. 2 shows, in its upper part, the variation of resistance R of a cord with application of tension T. With no tension applied, the resistance of the cord is at a steady value $R_s$; as tension T increases, the resistance falls towards a minimum value $R_{min}$.

The lower part of FIG. 2 shows the corresponding rate of increase f(V) of volume or intensity of sound V in the earphones 18. As low tension is applied to the cord, the intensity increases slowly, and then increases more rapidly as greater tension is applied. As the resistance of the cord continues to fall, the rate of increase of volume begins to fall also, and as the value of $R_{min}$ is reached, no further increase in volume can be applied.

Since the cords 22, 24 are elastic, on release of the tension they will return to their original length and to a steady state resistance value $R_s$. As the cords degrade with age, the value of $R_s$ is likely to change, but its nature as a steady value will not change.

Figure 3:
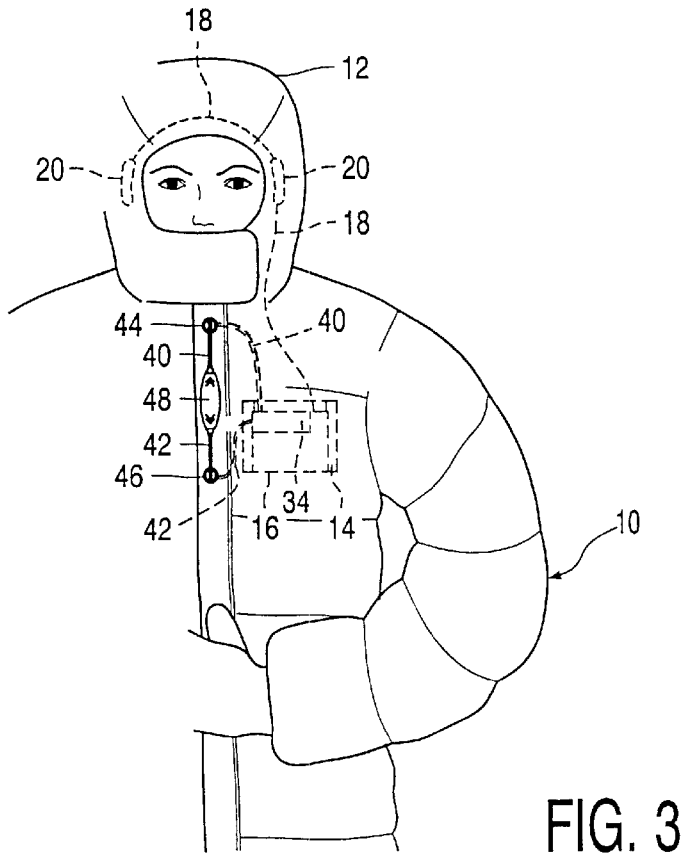
FIG. 3 illustrates a second embodiment of a manual control.

FIG. 3 shows an alternative embodiment of the control device. Control cords 40, 42 are each attached at one end electrically to the sensor circuit 34 of the radio 16 and mechanically to the garment 12, and at the other end pass through eyelets 44, 46 to the outside of the garment 10 where they are connected mechanically to opposite ends of an insulating grip or bead 48.

Figure 4:
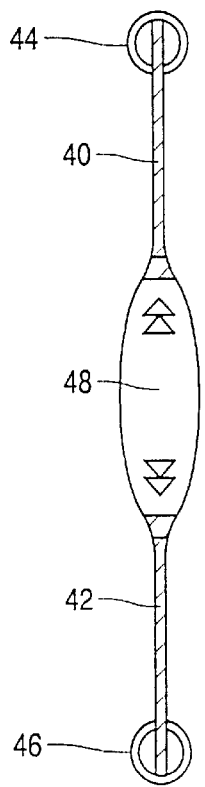
FIG. 4 illustrates a second embodiment of a manual control in more detail.

When the wearer of the garment 10 pulls the bead 48 downwards, cord 40 is stretched and the volume of sound in the earphones 18 is increased; when the wearer of the garment pulls the bead 48 upwards, cord 42 is stretched and the sound volume is decreased. FIG. 4 shows the cords and the bead in more detail.

As an alternative to volume control of a radio, a manual control according to the invention can also be used as a tuning device for a radio.

Other electronic devices which may form wearable electronics include a recording device, for example for recording spoken words via a microphone incorporated into the hood 12; the manual control can then be arranged to provide fast forward or rewind, or an indexing function for the recording device.

If the electronic device is camera-based, the manual control can be used for zoom-in and zoom-out functions.

For a simple electrical heating device incorporated into a garment, the manual control can be used to increase or decrease the temperature.

From the examples given above, it will be clear that any type of proportional electrical control can be provided. An on-off function is also possible, by setting a threshold value for the resistance R. By providing for simple connection to the cords 22, 24, different electronic devices may be selected from a collection owned by the garment wearer and simply carried in the pocket 14, using the same set of cords for control.

As an alternative arrangement (not illustrated) to the incorporation of the sensor circuit 34 within the electronic device such as the radio 16, a sensor circuit could be provided as a permanent part of the garment and the electronic device could then be connected directly to it.

From reading of the present disclosure, other modifications will be apparent to persons skilled in the art. Such modifications may involve other features which are already known in the design, manufacture and use of mechanical and electromechanical devices for controlling electrical or electromechanical circuits or devices controlled thereby and integrated within, or suitable for integration into, garments and fabrics for the manufacture thereof, which other features may be used instead of or in addition to features already described herein.

I claim:

1. A garment for use with an electronic device operationally coupled to a control means to vary a variable of the device, the garment comprising means to support the electronic device, including two flexible cords each having a first end connected electrically to the control means, the two cords having an electrical property which varies in accordance with tension applied to a second end of the cord longitudinally disposed from the first end of the cord wherein the control means is arranged to sense the electrical property of each cord and to vary the variable of the electronic device accordingly, the control means being arranged so that application of tension to the second end of one cord causes the control means to vary the variable of the electrical device in one direction, and application of tension to the second end of the other cord causes the control means to vary the variable in the opposite direction.

2. A garment according to claim 1, in which the second end of each cord is connected mechanically to opposite ends of an insulating manual grip.

3. A garment according to claim 1, in which there are two cords each connected at one end electrically to the control means, the control means being arranged so that application of tension to the second end of one cord causes the control means to vary the variable of the electrical device in one direction, and in which the second end of each cord is connected mechanically to opposite ends of an insulating manual grip.

* * * * *